United States Patent
Benbouzid et al.

(10) Patent No.: US 12,276,540 B2
(45) Date of Patent: Apr. 15, 2025

(54) ROTATING MACHINE VIBRATION MONITORING PROCESS FOR DETECTING DEGRADATIONS WITHIN A ROTATING MACHINE FITTED WITH MAGNETIC BEARINGS

(71) Applicant: SKF Magnetic Mechatronics, Saint-Marcel (FR)

(72) Inventors: Salim Benbouzid, Montigny-les-Cormeilles (FR); Joaquim Da Silva, Sennely (FR); Joel Mouterde, Blaru (FR)

(73) Assignee: SKF Magnetic Mechatronics, Saint-Marcel (FR)

( * ) Notice: Subject to any disclaimer, the term of this patent is extended or adjusted under 35 U.S.C. 154(b) by 263 days.

(21) Appl. No.: 17/888,557

(22) Filed: Aug. 16, 2022

(65) Prior Publication Data

US 2023/0075064 A1 Mar. 9, 2023

(30) Foreign Application Priority Data

Sep. 3, 2021 (EP) .................................... 21194716

(51) Int. Cl.
*G01H 1/00* (2006.01)
*G01M 13/00* (2019.01)
(Continued)

(52) U.S. Cl.
CPC ............ *G01H 1/003* (2013.01); *G01M 13/00* (2013.01); *G08B 21/18* (2013.01)

(58) Field of Classification Search
USPC ........................................................... 73/593
See application file for complete search history.

(56) References Cited

U.S. PATENT DOCUMENTS

| 5,347,190 A | 9/1994 | Lewis et al. |
| 7,882,394 B2 * | 2/2011 | Hosek ................... G06F 11/008 |
| | | 714/48 |

FOREIGN PATENT DOCUMENTS

| CA | 3082398 A1 * | 5/2019 | ........... G05B 19/418 |
| JP | 11287247 A * | 10/1999 | ........... F16C 32/0442 |

(Continued)

OTHER PUBLICATIONS

Active Magnetic Bearings used as an Actuator for Rotor Health Monitoring in Conjunction with Conventional Support Bearings, Proceedings of ASME Turbo Expo 2008: Power for Land, Sea and Air GT2008 Jun. 9-13, 2008, Berlin, Germany.

(Continued)

*Primary Examiner* — Clayton E. LaBalle
*Assistant Examiner* — Warren K Fenwick
(74) *Attorney, Agent, or Firm* — GARCIA-ZAMOR INTELLECTUAL PROPERTY LAW, LLC; Ruy Garcia-Zamor

(57) ABSTRACT

Rotating machine vibration monitoring process for detecting degradations within a rotating machine providing an output axle fitted with magnetic bearings, the magnetic bearings having at least a position sensor and at least a magnetic actuator, the process provides the following steps: 1) defining a set of excitations that does not destabilizes the rotating machine, 2) injecting the set of excitations in the rotating machine through the magnetic actuators and 3) measuring the response of the rotating machine checking whether the response verifies at least one predefined criterium, 4) if it is not the case, adjusting the properties of the set of excitations and resuming the process at the injection step, 5) if the response verifies the at least one criterium, determining at least one condition indicator based on the response mea- (Continued)

sured, 6) determining if an alarm is to be triggered based on the condition indicator determined.

15 Claims, 1 Drawing Sheet

(51) Int. Cl.
*G08B 21/00* (2006.01)
*G08B 21/18* (2006.01)

(56) References Cited

FOREIGN PATENT DOCUMENTS

| | | | |
|---|---|---|---|
| JP | 3837625 | B2 | 10/2006 |
| WO | 2007/008940 | A2 | 1/2007 |

OTHER PUBLICATIONS

Condition Monitoring of Rotor Using Active Magnetic Actuator, Travis Joel Bash, Thesis submitted to the faculty of the Virginia Polytechnic Institute and State University in partial fulfillment of the requirements for the degree of, Master of Science in Mechanical Engineering.

Condition Monitoring of Cracked Shaft using Active Magnetic Bearings, Chunliang Zhou*, Michael I. Friswell**, Jiying Li* * School of Power and Nuclear Energy Engineering, Harbin Engineering University, Harbin, 150001, Heilongjiang, P.R. China (E-mail: chunliangzhou@hrbeu.edu.cn; jinying.li@163.com) ** Department of Aerospace Engineering, University of Bristol, Bristol BBS 1TR, UK (E-mail: m.i.friswell@bristel.ac.uk).

* cited by examiner

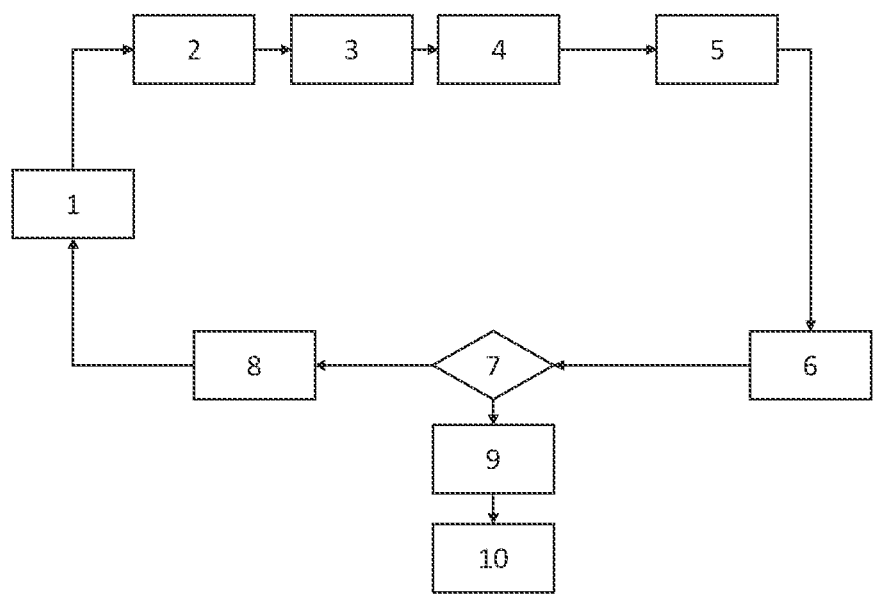

ROTATING MACHINE VIBRATION MONITORING PROCESS FOR DETECTING DEGRADATIONS WITHIN A ROTATING MACHINE FITTED WITH MAGNETIC BEARINGS

CROSS-REFERENCE TO RELATED APPLICATIONS

This application claims priority to European Patent Application no. 21194716.3, filed Sep. 3, 2021, the contents of which is fully incorporated herein by reference.

TECHNICAL FIELD OF THE INVENTION

The present invention relates to the command of rotating machines and more particularly, the command of active magnetic bearings within such machines.

BACKGROUND OF THE INVENTION

An active magnetic bearing comprises a stator and a rotor. Coils are generally fitted on the stator to create electromagnets that are powered by power amplifiers. For each axis, at least a position sensor like a gap sensor is able to determine the relative positions of the rotor and of the stator and feed the information to control electronics. Control electronics output commands for the power amplifiers that will inject voltages in the electromagnets coils to generate forces in order to keep the rotor levitated without mechanical contact with the stator. Different control laws can be used depending on the rotating machine fitted with the active magnetic bearing.

Vibration monitoring is a widely used for condition monitoring of rotating machines. Condition indicators are derived from vibration data and are compared to thresholds that enable to trigger an alert in case of abnormal behavior. Many degradations (for example cracks, tightening torque loss . . . ) will results in a modification of the transfer function of the component that is monitored. The evolution of the transfer function caused by such degradations will be observed using vibration monitoring only if there are some excitations generated by the machine and/or the process (unbalance, broadband perturbation generated by fluid structure interaction phenomenon . . . ) that have enough amplitude and for which the excitation signal properties are known or at least fulfil some specific properties such as stationarity or cyclostationarity.

These conditions are essential to be able to compare vibration before and after apparition of the degradations, with enough signal to noise ratio. Unfortunately, these conditions are not always met because these excitations cannot be easily adjusted in many cases. In addition, the transfer function between bearings and the sensors (generally positioned on a housing) can significantly attenuate the relevant signals in the frequency range of interest.

Many documents relating to motor output shafts supported by conventional bearings have been released proposing to use additional magnetic actuators to detect cracks on the motor rotor. Indeed, magnetic actuators enable injecting controlled excitations in a rotor. From the state of the art, the following documents are known:

Condition Monitoring of Cracked Shaft using Active Magnetic Bearings, Chunliang Zhou et al., International Conference on Power Engineering 2007, Active Magnetic Bearings used as an Actuator for Rotor Health Monitoring in Conjunction with Conventional Support Bearings, Travis Joel Bash, Thesis at Virginia Polytechnic, June 2005, Condition monitoring of rotor using active magnetic actuator, Jerzy T. Sawicki, et al., Proceedings of ASME Turbo Expo 2008, Damage Detection of a Rotating Cracked Shaft Using an Active Magnetic Bearing as a Force Actuator Analysis and Experimental Verification, D. Dane Quinn et. Al, IEEE/ASME Transactions on Mechatronics, Vol. 10, No. 6, December 2005

None of those documents describes a solution for detecting degradations occurring within rotating machines levitated by magnetic bearings, due to the inherent instability of such machines.

SUMMARY OF THE INVENTION

An aspect of the invention is a rotating machine vibration monitoring process for detecting degradations within a rotating machine comprising a rotor levitated by magnetic bearings, the magnetic bearings comprising at least a position sensor and at least a magnetic actuator, the process comprising the following steps:

defining a set of excitations that does not destabilizes the rotating machine, injecting the set of excitations in the rotating machine through the magnetic actuator of the at least one magnetic bearing, measuring the response of the rotating machine to the set of excitations through the position sensor of the at least one magnetic bearings, calculating parameters using available data pertaining to at least a part of the machine along with criteria based on the calculated parameters, checking whether the response verifies at least one criterium, if the response does not verify the at least one criterium, adjusting the properties of the set of excitations and resuming the process at the injection step, if the response verifies the at least one criterium, determining at least one condition indicator based on the response measured, determining if an at least one alarm is to be triggered based on the at least one condition indicator determined.

A criterium can be chosen among coherence, amplitude and stability or as a combination thereof.

Measurement of the rotating machine response can be performed thanks to both the position sensor of the at least one magnetic bearing and thanks to at least one additional sensor different from the magnetic bearings position sensor.

The set of excitations can be defined based on a dynamical model of at least a part of the machine.

The dynamical model can be adjusted based on the response measurements.

At least a step can be performed either offline or online.

The excitation can be of multisinus type.

Excitation injection can be performed by adding the excitation signal to at least one of the magnetic bearing position control input signal.

Excitation injection can be performed by adding the excitation signal to at least one of the magnetic bearing position control output signal.

Excitation signal can be comprised within the magnetic bearing position control output signal and determined simultaneously with it.

At least a condition indicator can be based either on an observer of residuals, on an observer of parameters or on an observer of system states.

Another aspect of the invention is a rotating machine vibration monitoring device, the rotating machine comprising a rotor levitated by magnetic bearings comprising at least a position sensor and at least a magnetic actuator, the device comprising processing means and at least a memory, the processing means being configured to execute the following steps:

defining a set of excitations that does not destabilizes the rotating machine, injecting the set of excitations in the rotating machine through at least magnetic actuators, measuring the response of the rotating machine to the set of excitations through position sensors of the magnetic bearings, calculating parameters using available data pertaining to at least a part of the machine along with criteria based on the calculated parameters, checking whether the response verifies the at least one criterium, if the response does not verify the at least one criterium, adjusting the properties of the set of excitations and resuming at the injection step, if the response verifies the at least one criterium, determining at least one condition indicator based on the response measured, determining if an at least one alarm is to be triggered based on the at least one condition indicator determined.

Measurements of the rotating machine response can be performed thanks to both the position sensor of the at least one magnetic bearing and thanks to at least one additional sensor different from the magnetic bearings position sensor.

The set of excitations can be defined based on a dynamical model of at least a part of the machine.

The dynamical model can be adjusted based on the response measurements.

BRIEF DESCRIPTION OF THE DRAWINGS

At least one of the embodiments of the present invention is accurately represented by this application's drawings which are relied on to illustrate such embodiment(s) to scale and the drawings are relied on to illustrate the relative size, proportions, and positioning of the individual components of the present invention accurately relative to each other and relative to the overall embodiment(s). Those of ordinary skill in the art will appreciate from this disclosure that the present invention is not limited to the scaled drawings and that the illustrated proportions, scale, and relative positioning can be varied without departing from the scope of the present invention as set forth in the broadest descriptions set forth in any portion of the originally filed specification and/or drawings. The present invention will be better understood from studying the detailed description of a number of embodiments considered by way of entirely non-limiting examples and illustrated by the attached drawing in which:

FIG. 1 shows the main steps of a rotating machine vibration monitoring process according to the invention.

DETAILED DESCRIPTION OF THE INVENTION

Those of ordinary skill in the art will appreciate from this disclosure that when a range is provided such as (for example) an angle/distance/number/weight/volume/spacing being between one (1 of the appropriate unit) and ten (10 of the appropriate units) that specific support is provided by the specification to identify any number within the range as being disclosed for use with a preferred embodiment. For example, the recitation of a percentage of copper between one percent (1%) and twenty percent (20%) provides specific support for a preferred embodiment having two point three percent (2.3%) copper even if not separately listed herein and thus provides support for claiming a preferred embodiment having two point three percent (2.3%) copper. By way of an additional example, a recitation in the claims and/or in portions of an element moving along an arcuate path by at least twenty (20°) degrees, provides specific literal support for any angle greater than twenty (20°) degrees, such as twenty-three (23°) degrees, thirty (30°) degrees, thirty-three-point five (33.5°) degrees, forty-five (45°) degrees, fifty-two (52°) degrees, or the like and thus provides support for claiming a preferred embodiment with the element moving along the arcuate path thirty-three-point five (33.5°) degrees. The process described herein can be applied continuously, or periodically or at predefined times. Moreover, different steps can be executed asynchronously, depending of the machine configuration. An example of such an asynchronous step, is the system model update. The process continues even if the system model update is not finished.

During a first step 1, a set of excitations that does not destabilizes the machine and the process are defined. A set of excitations is comprised as a series of commands for at least a magnetic bearing in order to generate forces or displacements superposed with the operating commands.

Excitations can exhibit different amplitudes, durations and shapes and can be adapted to optimize the detection depending on the type of degradation monitored. If the rotating machine comprises several magnetic bearings, the set of excitations can be defined for all the magnetic bearings and can be injected simultaneously.

Preferably, short excitations with low energy are defined to reduce the impact of the excitation on the machine behavior and risk of destabilizing the machine and the process. For example, step signal, selected periodic signal, impulse signal or wavelet signal can be used. Another advantage of short duration excitations is that, in some situations, more the machine response can be easily extracted from the signal. This is the case for processes with a varying perturbation level. As an example, a set of wavelets having the same shape, but different frequencies and amplitudes can be used.

Nevertheless, many other types of excitations can be used as for example sine sweep signal or continuous signal injection such as sine, square, broadband signal, pseudorandom binary sequence.

The excitations properties can be defined depending on some specific parameters such as machine operating conditions (speed, power . . . ) and actuators parameters (e.g. currents level to levitate the machine).

A machine dynamical model (analytical or empirical) can be used to define for each excitation the maximum amplitude depending on other excitation properties (such as frequency) not to destabilize the machine. The model can also be used to check that an excitation with predefined properties will not destabilize the machine. An iterative loop can be setup to define the excitations amplitudes using the model starting from an initialized amplitude value. For example, the model can indicate that for some frequency, the excitation will be too highly amplified, or the destabilization risk is too high, so that excitation level should be lowered, and vice versa. The model can depend on operating parameters and integrate parametric uncertainties for more representativeness. The initial model can be defined using system design knowledge (e.g. finite element modeling for the rotor and magnetic bearings, first or second order systems for sensors & amplifiers) and be updated through standard identification process before machine operation. The model can depend on system operating conditions.

The set of excitations properties can be defined offline, before machine operation, and/or defined or updated regularly during machine operation to adapt to the machine behavior.

The set of excitations signals can be mono-variable and injected through AMB (acronym for "Active Magnetic Bearing") actuators, one after the other or defined for many AMBs as a multivariable signal injected simultaneously through all AMB actuators. Excitation signals are injected in a closed loop topology, as a force signal included in the controller outputs or as a displacement included in the controller inputs. In both cases, the excitation signals must be homogeneous to the controller outputs and inputs.

To maintain rotor levitation, different types of control laws can be used such as a combination of a PID (acronym for "proportional Integral Derivate") control combined with notch filters, adaptive command law or predictive command law. The excitations can be superposed to the system control law. In this case, for example, if a force excitation is used, the total force command provided by the control board will be the sum of the command linked to standard control and the additional force excitation.

If specific control laws with internal models or observers are used, such as predictive command law or state feedback control, the objective of online system identification is to reconfigure some controller parameters. The resulting command enables both to maintain rotor levitation and to generate appropriate excitations in order to identify the system dynamic behavior. As an example, if a parametric model is used to describe the system, the optimization process could consist in maximizing the sensitivity of the systems outputs versus model parameters, under constraints such as system maximal/minimal command and maximal displacement of the rotor.

An example of a predictive command will now be described.

If we consider the system described by the following equation:

$$\begin{cases} x(k+1) = A(\theta)x(k) + B(\theta)u(k) \\ y(k) = C(\theta)x(k) \end{cases} \quad [\text{Eq 1}]$$

With:
$x=(x_1, \ldots x_q)$: the system states
$u=(u_1, \ldots u_i)$: the command
$y=(y_1, \ldots y_n)$: the output
$=(\theta_1, \ldots \theta_p)$: the system parameters At each time step, a command vector $u(k), \ldots, u(k+N)$ is sought that maximize the cost function J described by the following equation:

$$J(k) = \frac{\beta}{w_1} \frac{1}{N} \sum_{k=k}^{k+N} \text{trace}(I(i)) \frac{(\beta-1)}{w_2} \frac{1}{N} \sum_{k=k}^{k+N} x(i)^T Q x(i) + u(i)^T R u(i) \quad [\text{Eq 2}]$$

With:

$$I(k) = \left\| \left( \frac{\theta_j(k)}{y_i(k)} y_{i,\theta_j(k)} \right)_{i,j} \right\|_2 \quad [\text{Eq 3}]$$

$\hat{\theta}_j(k)$: the j-th components of the estimate of $\theta$ at time step k.

$$y_\theta(k) = (y_{i,\theta_j(k)})_{i \in [1, \ldots, n], j \in [1, \ldots, p]} \quad [\text{Eq 4}]$$

$$x_\theta(k) = (x_{i,\theta_j(k)})_{i \in [1, \ldots, q], j \in [1, \ldots, p]} \quad [\text{Eq 5}]$$

$y_\theta(k)$ and $x_\theta(k)$ being defined by the following equations:

$$\begin{cases} x_\theta(k+1) = A(\theta)x_\theta(k) + \frac{\partial A}{\partial \theta}(\theta)x(k) + \frac{\partial B}{\partial \theta}(\theta)u(k) \\ y_\theta(k) = C(\theta)x_\theta(k) + \frac{\partial C}{\partial \theta}(\theta)x(k) \end{cases} \quad [\text{Eq 6}]$$

$\beta \in [0,1]$, $w_1$ and $w_2$ are coefficients adjusted to have the two terms of the cost function of the same order of magnitude (before applying $\beta$ and $\beta-1$ coefficients).

R and Q are positive definite matrix (e.g. identity).

N defines the prediction horizon.

The optimization is done under the following constraints:

$$\begin{cases} u \in [u_{min}, u_{max}] \\ x \in [0, x_{max}] \end{cases} \quad [\text{Eq 7}]$$

It is to be noted that Q and R can be fixed to reduce calculation complexity or updated during the optimization.

Other costs functions can be used, for example by replacing u by ù in the expression of J. u can also be decomposed on the first Laguerre functions to reduce complexity.

In other words, the command depends on at least some among the system model, the system states, the system inputs, the previous command signals, the measured command and system response signals and specific constraints for machine operation.

During a second step 2, the excitations are injected in the system, once they are defined, using the magnetic actuators, power amplifiers and the magnetic bearings control electronics.

Such excitation can be either added to the commands outputted by the control electronics, added to the data input into the control electronics or generated by the control electronics and directly embedded within the commands outputted.

During a third step 3, the response of the rotating machine to the set of excitations is measured. However, the measurement can be unrepresentative of the system if the system reacts within the duration of the second step 2.

In order to avoid such an unrepresentativeness, response measurement can be performed during the second step 2. The control electronic have to be specifically designed to be able to cope with perturbation injection and response measurement, simultaneously or in quick sequence.

The machine response to the excitations is measured preferably using magnetic bearings position sensors. In particular embodiments, current and voltage sensors are also used to measure system response. The magnetic bearings position sensors are also used for the control of the magnetic bearings position and the current and voltage sensors for the control of magnetic bearings amplifiers. These sensors directly measure the shaft deviation from the airgap center with a very high accuracy. Nevertheless, differently placed sensors (i.e. placed on the housing) can be used independently or advantageously in combination with magnetic bearings sensors. This could enable to analyze stator dynamic behavior and some coupling phenomena (cross coupling parameters).

Signal processing techniques such as filtering can be used to extract the response from exogenous perturbations (process . . . ).

Current and voltage sensors associated to AMB coils, provide very useful information about AMB and the electrical power supply. This information combined with measured positions provides an estimate of the rotor behavior and its interaction with the environment.

Additional sensors can be available in the machines providing information about the shaft rotation speed and the temperature at some sensitive locations (AMB and motor winding). Those measurements and data can also be used in the diagnosis and the elaboration of condition indicators and states of health.

The condition monitoring system of a machine on AMB in its environment can have access to some external measurements about the process as for example: pressures, flows, temperatures, alarms and data about operating conditions. Those measurements can also be used in the diagnosis and in the elaboration of condition indicators and states of health.

During a fourth step 4, the system model parameters, systems states and unknown inputs are estimated and updated.

An initial model can be defined for example as described in step 1. Then, it can be adjusted using measurements. The model can be updated for example at each time step or after each time the full response of the system to an excitation or to a set of excitations have been measured. The system model can be described using different forms of representation such as parametric models (e.g. analytical models with physical parameters when enough prior knowledge about the system is available) and non-parametric models (e.g. FRF (Frequency Response Functions), FRM: Frequency Response Matrix). If a linear model is used, the order of the model can be adjusted to reach the targeted accuracy.

The system characterization can be either the FRF or the FRM of the control loop sensitivity function: S or T of the pseudo open loop (ISO 14839-3):

$$T(j\omega_k) = -\frac{CtrlOut(j\omega_k)}{F_{Ext}(j\omega_k)} \quad \text{[Eq 8]}$$

$$S(j\omega_k) = -\frac{U(j\omega_k)}{F_{Ext}(j\omega_k)}$$

An identified function representing the machine without the controller can also be used, such as a non-parametric identified linear model as a Frequency Response Matrices (FRM):

$$\hat{G}(j\omega_k): \hat{G}(j\omega_k) = \hat{Y}(k)\hat{U}(k)^{-1} \quad \text{[Eq 9]}$$

$$\hat{U}(k) = \begin{bmatrix} \hat{U}_{1,1}(\omega_k) & \cdots & \hat{U}_{1,n_u}(\omega_k) \\ \vdots & \ddots & \vdots \\ \hat{U}_{n_u,1}(\omega_k) & \cdots & \hat{U}_{n_u,n_u}(\omega_k) \end{bmatrix} \quad \text{[Eq 10]}$$

$$\hat{Y}(k) = \begin{bmatrix} \hat{Y}_{1,1}(\omega_k) & \cdots & \hat{Y}_{1,n_u}(\omega_k) \\ \vdots & \ddots & \vdots \\ \hat{Y}_{n_u,1}(\omega_k) & \cdots & \hat{Y}_{n_u,n_u}(\omega_k) \end{bmatrix} \quad \text{[Eq 11]}$$

$$\hat{U}_{i,j}(\omega_k) = \frac{1}{P}\sum_{l=1}^{P} U_{i,j}^{[l]}(k) \quad \text{[Eq 12]}$$

with:

$$U_{i,j}^{[l]}(k) = \frac{1}{\sqrt{N_{ms,l}}}\sum_{n=0}^{N_{ms,l}-1} U_{i,j}^{[l]}(nT_s)e^{-j2\pi nk/N_{ms,l}} \quad \text{[Eq 13]}$$

$$\hat{Y}_{i,j}(\omega_k) = \frac{1}{P}\sum_{l=1}^{P} Y_{i,j}^{[l]}(k) \quad \text{[Eq 14]}$$

with:

$$Y_{i,j}^{[l]}(k) = \frac{1}{\sqrt{N_{ms,l}}}\sum_{n=0}^{N_{ms,l}-1} Y_{i,j}^{[l]}(nT_s)e^{-j2\pi nk/N_{ms,l}} \quad \text{[Eq 15]}$$

When prior knowledge of the system are accurate enough, an analytical model with parameters can be used as initial model or initial structure for a parametric identification. It can be adjusted using previous measurements. The model can be updated for example at each time step or after each time the full response of the system to an excitation or to a set of excitations have been measured.

Many methods can be used to update the model parameters. Some model parameters can be updated using least square minimization-based methods. Identification algorithms such as subspace methods and neural networks (e.g. artificial and/or recurrent neural networks) can also be used.

Some parameters observers can also be defined to update model parameters at each time step.

At this step, system states and system inputs useful for the control of the machine can also be estimated.

System states can be characterized using states observers (linear or non-linear, full or reduced system observers). In this case, the outputs of the observers are non-measured variables (inner states) providing good indicators about the status of the system (e.g. deviations and velocities at critical locations, temperatures).

In some specific control structures (states feedback, phase plan based controls), the observed states $\hat{x}$ are a part of the rotor dynamic control loop. Examples of observed states are rotor radial velocity or acceleration in radial magnetic bearing planes and rotor axial velocity and acceleration observers:

$$d\hat{x}/dt = A\,\hat{x} + g(\lambda, \hat{x}, \phi_{ref}, \Omega) + h(\Omega, L, (\hat{y} - y))\ \hat{y} = C\hat{x} \quad \text{[Eq 16]}$$

With:
$\Omega$: the rotation speed and
$\lambda$: a vector of model parameters.
$\phi_{ref}$: flux command or force command System characterization can also include inputs and parameters observers (linear or non-linear).

$$\begin{bmatrix} \dfrac{d\hat{x}}{dt} \\ \dfrac{d\hat{F}_d}{dt} \\ \dfrac{d\hat{\theta}}{dt} \end{bmatrix} = \quad \text{[Eq 17]}$$

$$A_{F_{d,\theta}}\begin{bmatrix} \hat{x} \\ \hat{F}_d \\ \hat{\theta} \end{bmatrix} + g_{F_{d,\theta}}(\lambda, \hat{x}, \phi_{ref}, \hat{\theta}, \hat{F}_d, \Omega) + h_{F_{d,\theta}}(L, (\hat{y} - y), \Omega)$$

$$\hat{y} = C_{F_{d,\theta}} \begin{bmatrix} \hat{x} \\ \hat{F}_d \\ \hat{\theta} \end{bmatrix}$$

-continued

In equations [Eq 16] and [Eq 17], variables (A, $A_{F_{d,\theta}}$, $\lambda$, L) can be updated using previous measurements (responses to excitations) to take into account the system drifts.

Parameter observers can provide direct information about phenomena at specific locations on the rotors (impellers locations, labyrinth or seals locations). When the estimation of the parameters drifts and takes values outside a safe and healthy realization area, warnings and alarms can be generated.

During a fifth step 5, parameters are determined based on applied commands, measured response, system model, system state, and system inputs to asses identified model accuracy and stability.

During a sixth step 6, criteria are computed based on the determined parameters.

During a seventh step 7, it is checked whether the response verifies at least a criterium. The objective of this step is mainly to ensure that the signal to noise ratio is high enough and that the machine response to the excitations injected is not a too high. Good criteria identified are for example high enough coherence between injected signal and response, not too high machine displacement after excitation.

If such is not the case, the process proceeds to an eight step 8, during which the excitations properties are adjusted. It is also checked that the new set of excitations will not destabilize the machine.

In a particular embodiment, if a machine dynamical model is used to define for the excitations, it can be adjusted using measurements. The criteria can be updated according to the updated model.

In order to update the criteria, an algorithm can be used to adjust the excitation properties to better fit the criteria defined previously (e.g. coherence, amplitude, stability). For example, if the coherence is too low, the excitation amplitude can be increased (for example from a percentage) without exceeding a threshold (to avoid destabilizing). Inversely, if the generated displacements are higher than expected with a coherence very close to one, the excitation level can be decreased (for example from a percentage). The process then resumes at the second step 2. In other words, an updated command law is determined.

If during the seventh step 7, it is checked that the response verifies the at least one predefined criterium, the process proceeds to a ninth step 9, during which condition indicators based on the response measured are determined.

Condition indicators can easily be derived from the transfer function to assess its evolution. The transfer function can be calculated by correlating the response with the excitations. Many degradations of the rotating machine will result in an evolution of the transfer function. A simple example would be the average amplitude in a frequency range.

The process then proceeds to a tenth step 10, during which at least one alert is triggered based on condition indicators values.

Any known method for condition monitoring can be used to establish thresholds to trigger alerts. Conditions indicators for the machines on AMBs are derived from the initial system characterization and the updated system characterization after the injection of the excitations in the closed loop. Considering the phenomena under interest, many methods and technics can be used to build our conditions indicators.

Some observers can be defined based on system model to estimate parameters that can be used as condition indicators. A reference model can be used for such observers to track an evolution of machine behavior.

Combination of condition indicators can be advantageously used, so as learning phases.

Example of condition indicators are spectral density energy within a frequency band, spike in the transfer function, transfer function in a frequency band.

A few examples on how to build condition indicators using the system model identified using our method are given below:

Indicators Based on Transfer Functions:

The measured sensitivity transfer functions of the AMB closed loop and the system identified model (experimental FR and FRM) are important indicators if the degradations cause an evolution in these transfer functions. As long as the transfer function is located within the safe and healthy realization area, the system can be considered as having a nominal behavior. When the transfer function exits this area due to the drift, the closed loop can be considered dysfunctional with minor or major failure.

When the non-parametric models (measured FRF and FRM) are located partially or completely outside the safe and healthy realization area, an error occurred. If the case of soft drift, a reconfiguration can set by updating the controller parameters. When the drift is too important because it hints at a major failure, a shutdown request can be generated.

Another simple example of condition indicator would be the RMS amplitude of the previous transfer function in a frequency range in the vicinity of structural frequencies. Other indicators such as resonance frequencies, resonance amplitudes and quality factor can be used. The history of transfer functions (successive characterizations) can be used to generate condition indicators by calculating the RMS difference of the current transfer function and a reference transfer function (characterization set as nominal).

Elaboration of Residuals:

Transfer functions describes linear behavior. However, many phenomena and behaviors are non-linear and non-linear parametric models can be identified using the injected excitation. An initial structure for the parametric model must be defined using prior knowledge about the machine. The structure of the parametric model can then be updated by iterations (increase or reduce order, add or simplify phenomena). Model parameters can be identified using a dedicated optimization algorithm under inequality constraints. The optimization algorithm aims to minimize a criterion representing the error between the system responses and the model responses. The criterion can contain additional information.

If we note $\hat{\theta}$ the identified parameter, and $\theta_0$ the reference value of this parameter, the ratio $$\left| \frac{\hat{\theta} - \theta_0}{\Delta \theta} \right|$$

can be a condition indicator. A combination of $$\left| \frac{\hat{\theta}_{i,0} - \theta_{i,0}}{\Delta \theta_i} \right|$$

can be used to build residuals. Those residuals are themself condition indicators.

Some important parameters can be the output of observer. In particular, the parameters drift is local and concerns only some parameters directly linked to some locations on the rotor. This parameter drift is then linked to a dysfunctional behavior at known locations. Linking conditions indicators to dysfunctions at known locations enables to pinpoint failures and can be attained using dedicated observers and models. The same dedicated observers and models enable to directly generate residuals as conditions indicators.

Such residuals can be determined through methods based on parity equation or observers with unknown inputs as described by the following equations.

$$\frac{d\hat{x}}{dt} = A(\Omega)\hat{x} + B\phi_{ref} + g(\lambda, \hat{x}, \Omega) + L \cdot (C\hat{x} - y) \quad \text{[Eq 18]}$$

$$\hat{y} = C\hat{x}$$

$$r(t) = Q \cdot (C\hat{x} - y)$$

Where

L and Q: observer matrixes with parameters to find r(t): a vector of residuals (condition indicators vector)

Each residual is insensitive to at least a known failure. The analysis of all residuals allows to detect a failure and its location (seals; labyrinths, impellers, . . . ).

A reference model can be used for such observers to track a drift of the machine behavior.

Fuzzy-Logic and Neural Network Based Algorithms:

Neural Network (Artificial and recurrent) can be used as models. They provide an interesting alternative when the studied phenomena cannot be described accurately using a deterministic modelling with physical laws. A neural network can be used to identify a complete model (linear or non-linear) or some parts of the model (as mentioned in step 4). They can used also to design inputs or parameter observers. In all cases, a learning phase (often offline) is needed to configure the neural network and set the initial identified model or the initial observer. After each set of excitations, the neural network is updated. The history of the neural network output drifts from the nominal behavior defines condition indicators exactly as in the case of previous deterministic models.

Fuzzy logic technics can be used as the formalization of an intuitive understanding of phenomena based on experiences. Fuzzy logic provides tools to build intuitive condition indicators based on several information from observations, measurements, estimations, residuals and other condition indicators to classify the system health state or the presence of a type of failure.

Some conditions indicators well known in the literature in the field of "passive" monitoring can also be used in parallel of the indicators defined herein such as spectrum/full spectrum harmonics, maximum rotor radial/axial displacements and velocities, maximal currents . . . .

During a tenth step 10, alerts are triggered based on comparison of the condition indicators values to predetermined values or thresholds. Alerts can be visual alerts, audio alerts, alert signals, triggering of fallback positions or controls, or a combination of at least two of those kinds of alerts.

Multiple thresholds can be compared to a single condition indicator values, each triggering a different alert.

Steps 4, 9 and 10 can be performed either offline or online.

It is to be noted that steps 5 to 8 are preferably performed online in order to prevent a system instability.

A particular embodiment of the process will now be described. During step 1, the command can be calculated as a sum of a command that enable to maintain stable levitation of the rotor and a command to generate excitation for identification. The command to levitate the machine can be determined using usual methods existing in the state of the art.

The excitation used can be for example a multi-sine signal, as described by the following equation:

$$F_{Exc}(k \cdot T_s) = \sum_{i=1}^{P_{ms}} A_i \cdot \sin(\omega_i \cdot k \cdot T_s + \varphi_i) \quad \text{[Eq 19]}$$

With:
K=0, 1, . . . , $N_{ms}$−1

$$N_{ms} = \text{round}\left(\frac{1}{f_{res}T_s}\right) \quad \text{[Eq 20]}$$

$\omega_i$: the pulsation of the i-th sinus
$A_i$: the amplitude of the i-th sinus
$\varphi_i$: the phase of the i-th sinus
$P_{ms}$: the total number of used sinus
$T_s$: the time sampling period
$F_{res}$: the frequency resolution desired for the FFT
$F_{Exc}(k \cdot Ts)$ defines a basic sequence of multi-sinus and it can be repeated P times.

Finally, the duration of the multi-sinus excitation is defined by the following equation:

$$T_{End} = ((P \cdot N_{ms})-1) \cdot T_s \quad \text{[Eq 21]}$$

The values of $P_{ms}$ and $\omega_1$ are chosen depending on the structural frequencies of the system to identify (resonant peaks and antiresonances, frequency range of the roll-off), i.e. the variations of the transfer function amplitude as a function of frequencies. The values of $\varphi_i$ can be determined using a clipping algorithm to minimize the amplitude of the whole excitation signal.

For example, at the initialization step, all the $A_i$ could be chosen with the same amplitude. The $\omega_i$ can be chosen equally distributed over the frequency axis.

A model can be used to check that with the excitation signal, the displacement of the rotor will not be superior to a predefined value. This value should be inferior to the airgap between the rotor and the touch down bearings, along with an additional safety margin. The threshold can also be set to ensure that the system behavior remain in the linear domain to ensure stability. These criteria can be used each time an excitation signal is to be injected in the system.

Then the coherence function between the injected excitation and the measured response can be calculated. For the next excitation signals, the amplitudes $A_k$ can be increased for the frequencies $\omega_1$ where the coherence function is too low and can eventually be decreased for the $\omega_i$ where the coherence function is close to 1. The $\omega_1$ frequency distribution can be changed to have reduced intervals between $\omega_i$ and $\omega_i$+1 where the transfer function of the system has high variations and to have increased intervals where transfer function of the system has low variations.

Many iterations can be done until finding the appropriate excitation signal. The excitation can also be done frequency band per frequency band to avoid injecting an excitation signal with too high amplitude, or simply to focus on areas of interest.

During steps 2 and 3, the excitations are injected in the system and the responses are measured.

During step 4, an initial model is defined. For example, the control board can be modeled using control algorithm specification. Power amplifiers and position sensors can be modeled using a 1st order filter. The magnetic bearing and rotor dynamic models can be determined using finite element modeling. In our example, our initial model is updated once at machine startup by replacing the rotor model by the frequency domain model identified at machine startup. The model can eventually be updated after maintenance performed on the machine.

During step 5, the coherence function between injected command and response measured is calculated.

During step 6, it is determined if the coherence at the frequency of interest is higher than a threshold set between 0 and 1 (the closer to 1, the better for identification, i.e. above 0.8).

During step 7, if the coherence is higher than the criterion on the frequency ranges predefined for the first rigid and flexible modes, the calculation of condition indicators will be done. Indeed, it will be possible to calculate the transfer function of the system accurately.

Parameters representative of the difference between the transfer/sensitivity functions of our model and the real machine (e.g. difference between resonant frequency values, least square criterion on some frequency bands . . . ) can be computed. It is to be noted that the model and system response can depend on operating conditions. Computation of the parameters is performed during next step 8.

During step 8, the first rigid and flexible modes of the rotor are determined along with the relative ratio between the frequency of the modes extracted from the current transfer function and the frequency of the modes extracted a transfer function from a reference model. These ratios are considered as condition indicators.

To extract these frequencies, a frequency range around the mode is predefined using the reference model and the frequency corresponding to the maximum amplitude in this frequency range for the considered transfer function is used.

During step 9, if the condition indicators values deviate from 0, it is considered that the rotor mode frequencies have changed and therefore that the machine behavior has evolved. A threshold can be set for example at 0.1 to track a 10% deviation of the mode frequencies.

During step 10, alerts are emitted if a further drift is determined.

The invention claimed is:

1. A rotating machine vibration monitoring process for detecting degradations within a rotating machine comprising:
a rotor levitated by magnetic bearings, the magnetic bearings comprising at least a position sensor and at least a magnetic actuator, the process comprising the following steps:
defining a set of excitations that does not destabilizes the rotating machine,
injecting the set of excitations in the rotating machine through the magnetic actuator of the at least one magnetic bearing,
measuring a response of the rotating machine to the set of excitations through the position sensor of the at least one magnetic bearings,
calculating parameters using available data pertaining to at least a
part of the machine along with criteria based on the calculated parameters,
checking whether the response verifies at least one criterium,
if the response does not verify the at least one criterium, adjusting the properties of the set of excitations and resuming the process at the injection step,
if the response verifies the at least one criterium, determining at least one condition indicator based on the response measured,
determining if an at least one alarm is to be triggered based on the at least one condition indicator determined.

2. The rotating machine vibration monitoring process according to claim 1, wherein a criterium is chosen among coherence, amplitude and stability or as a combination thereof.

3. The rotating machine vibration monitoring process according to claim 1, wherein measurements of a rotating machine response are performed to both the position sensor of the at least one magnetic bearing and to at least one additional sensor different from the position sensor.

4. The rotating machine vibration monitoring process according to claim 1, wherein the set of excitations is defined based on a dynamic model of at least a part of the machine.

5. The rotating machine vibration monitoring process according to claim 4, wherein the dynamic model is adjusted based on the response measurements.

6. The rotating machine vibration monitoring process of claim 1, wherein at least a step is performed either offline or online.

7. The rotating machine vibration monitoring process according to claim 1, wherein the excitation is of multisinus type.

8. The rotating machine vibration monitoring process according to claim 1, wherein excitation injection is performed by adding an excitation signal to at least one of the magnetic bearing position control input signals.

9. The rotating machine vibration monitoring process according to claim 1, wherein excitation injection is performed by adding an excitation signal to at least one magnetic bearing position control output signals.

10. The rotating machine vibration monitoring process according to claim 1, wherein excitation signal is comprised within a position control output signal and determined simultaneously with it.

11. The rotating machine vibration monitoring process according to claim 1, wherein at least a condition indicator is based either on an observer of residuals, on an observer of parameters or on an observer of system states.

12. A rotating machine vibration monitoring device, the rotating machine comprising:
a rotor levitated by magnetic bearings comprising at least a position sensor and at least a magnetic actuator, the device comprising processing means and at least a memory, the processing means being configured to execute the following steps:
a set of excitations that does not destabilizes the rotating machine is defined,
the set of excitations in the rotating machine through at least magnetic actuators is injected, a response of the rotating machine to the set of excitations through position sensors of the magnetic bearings is measured, parameters using available data pertaining to at least a part of the machine along with criteria based on a plurality of calculated parameters is calculated, whether the response verifies the at least one criterium, if the response does not verify the at least one criterium is checked, a plurality of properties of the set of excitations and resuming at the injection step is adjusted, if the response verifies the at least one criterium, determining at least one condition indicator based on the response measured, determining if an at least one alarm is to be triggered based on the at least one condition indicator determined.

13. The rotating machine vibration monitoring device according to claim 12, wherein measurement of the rotating machine response are performed by both the position sensor of the at least one magnetic bearing and at least one additional sensor different from the magnetic bearings position sensor.

14. The rotating machine vibration monitoring device according to claim 12, wherein the set of excitations is defined based on a dynamic model of at least a part of the machine.

15. The rotating machine vibration monitoring device according to claim 14, wherein the dynamic model is adjusted based on a plurality of response measurements.

* * * * *